(12) United States Patent
Fujita

(10) Patent No.: US 12,494,356 B2
(45) Date of Patent: Dec. 9, 2025

(54) MASS SPECTROMETER

(71) Applicant: SHIMADZU CORPORATION, Kyoto (JP)

(72) Inventor: Shinjiro Fujita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 466 days.

(21) Appl. No.: 18/182,486

(22) Filed: Mar. 13, 2023

(65) Prior Publication Data

US 2023/0352290 A1 Nov. 2, 2023

(30) Foreign Application Priority Data

Apr. 26, 2022 (JP) .................................. 2022-072101

(51) Int. Cl.
*H01J 49/02* (2006.01)
(52) U.S. Cl.
CPC .................................. *H01J 49/025* (2013.01)
(58) Field of Classification Search
CPC ........ H01J 49/022; H01J 49/025; H01J 49/26; H01J 49/0031; H01J 49/0036
See application file for complete search history.

(56) References Cited

U.S. PATENT DOCUMENTS

| | | | |
|---|---|---|---|
| 9,991,104 B2 | 6/2018 | Collings et al. | |
| 11,469,091 B1* | 10/2022 | Fisher | H01J 49/025 |
| 2006/0080045 A1 | 4/2006 | Steiner | |
| 2012/0074309 A1* | 3/2012 | Hirano | H01J 49/105 |
| | | | 250/288 |

(Continued)

FOREIGN PATENT DOCUMENTS

| | | |
|---|---|---|
| JP | 06-181046 A | 6/1994 |
| JP | 2008-516411 A | 5/2008 |
| JP | 2011-014481 A | 1/2011 |

(Continued)

OTHER PUBLICATIONS

Office Action dated Sep. 16, 2025 in Japanese Application No. 2022-072101.

*Primary Examiner* — David E Smith
(74) *Attorney, Agent, or Firm* — Sughrue Mion, PLLC

(57) ABSTRACT

In a mass spectrometer, a detector generates a current-pulse signal corresponding to an incident ion, with a gain corresponding to a detector voltage which is given by a voltage-generating section. A branching section divides, into branches, a voltage-pulse signal which is based on the current-pulse signal taken from the detector's anode. A pulse-counting section detects the signal one branch by a pulse-count method. An analog detection section detects the signal in another branch by an analogue detection method. A conversion-information storage section holds conversion information showing a relationship between an unsaturated predetermined pulse-count value and the corresponding analog detection value under the detector voltage given to the detector during a measurement. A converted-count-value calculation section calculates a converted count value when the pulse-count value or the analog detection value obtained by a measurement exceeds a predetermined value, using the analog detection value obtained by the measurement and the conversion information.

7 Claims, 11 Drawing Sheets

(56) References Cited

U.S. PATENT DOCUMENTS

2015/0325420 A1  11/2015  Collings et al.
2020/0194246 A1  6/2020  Sheils et al.

FOREIGN PATENT DOCUMENTS

| JP | 2016-85817 A | 5/2016 | | |
|---|---|---|---|---|
| JP | 2021-96158 A | 6/2021 | | |
| WO | WO-2009027252 A2 | * | 3/2009 | ............ H01J 49/025 |
| WO | WO-2020203134 A1 | * | 10/2020 | ............ H01J 49/025 |

* cited by examiner

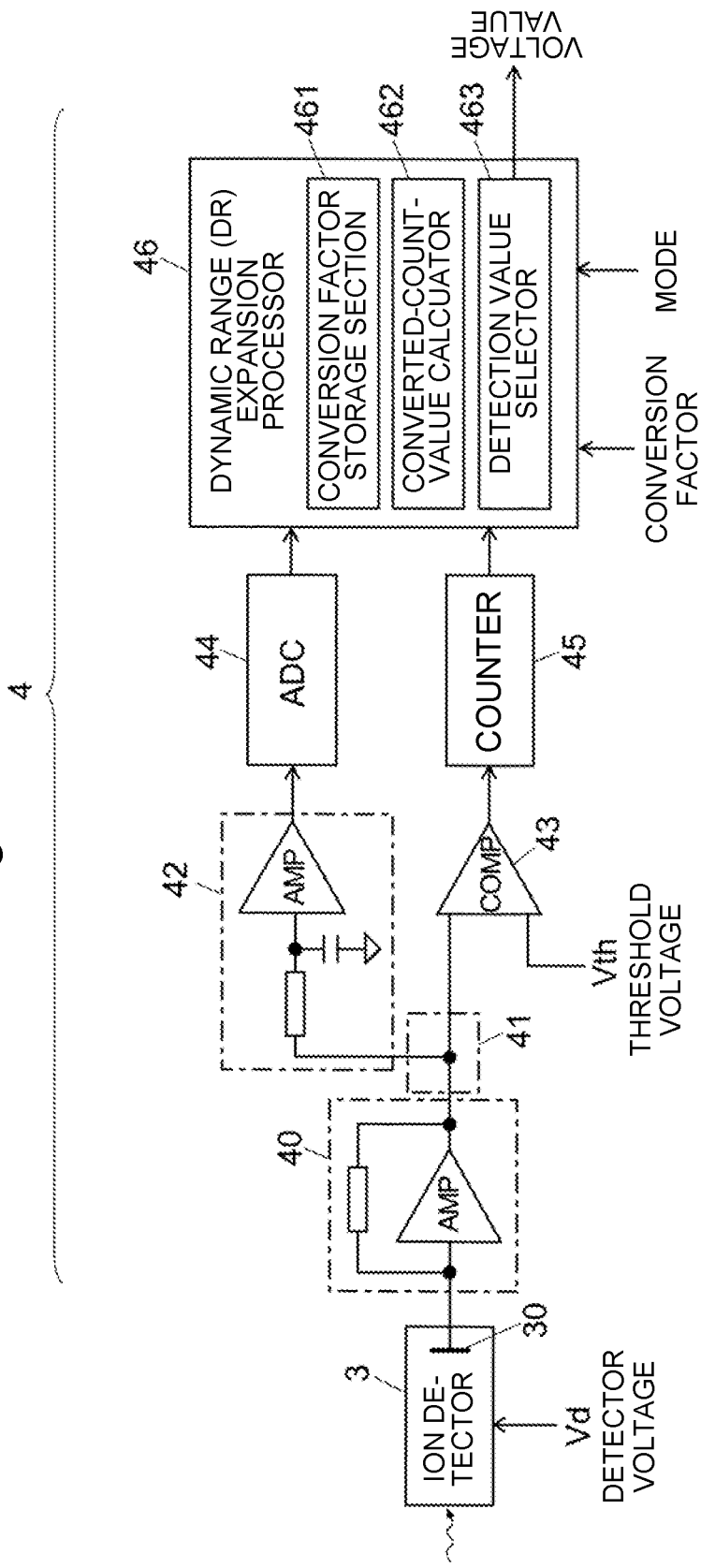

Fig. 3A  PULSE-COUNT DETECTION SYSTEM
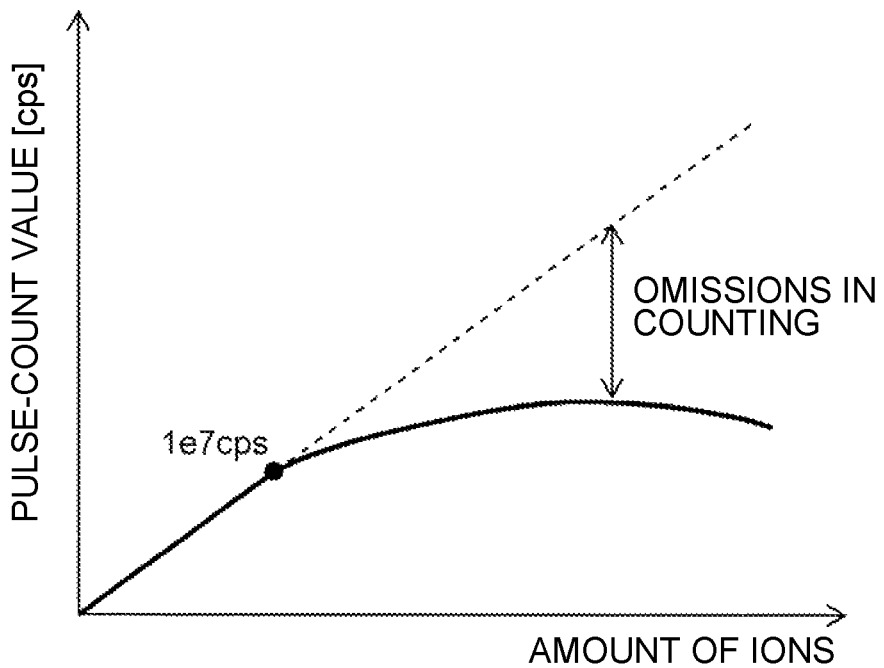
Fig. 3B  ANALOG DETECTION SYSTEM
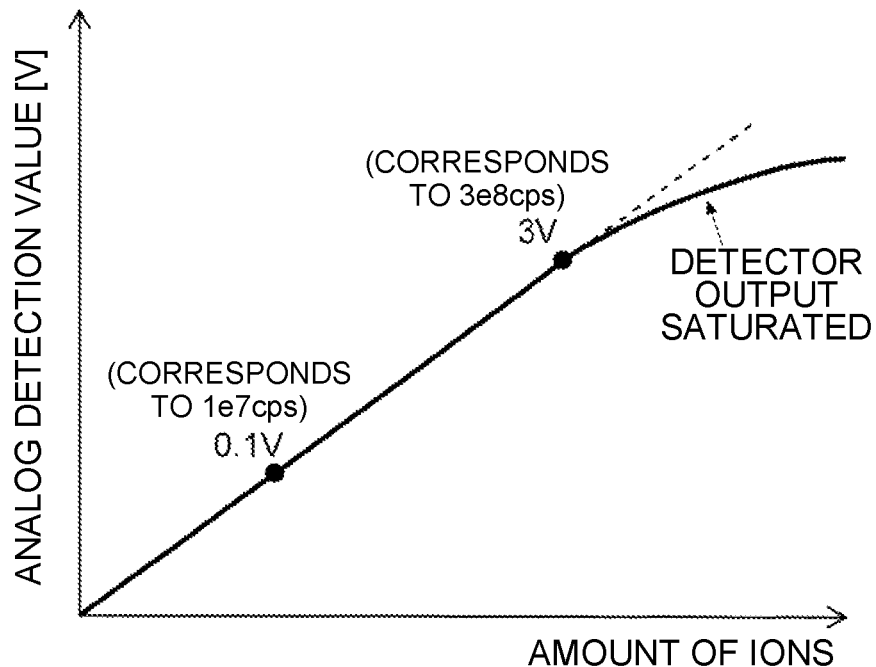

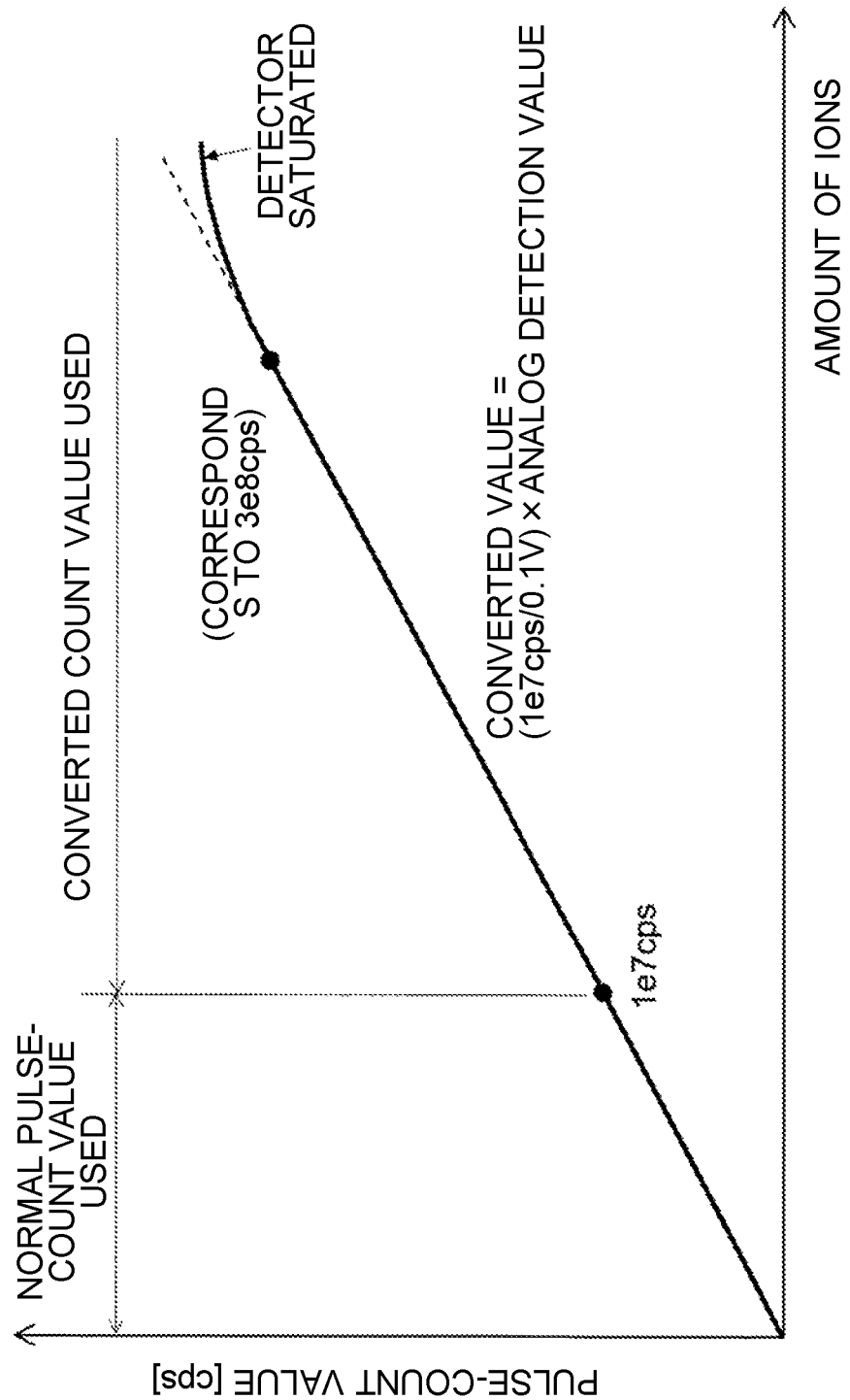

| DETECTOR OPERATION MODE | DETECTOR VOLTAGE | CONVERSION FACTOR (cps/V) |
|---|---|---|
| SENSITIVITY-ORIENTED MODE | V1 | 0.67e8 |
| BALANCE MODE | V2 | 1e8 |
| DYNAMIC-RANGE-ORIENTED MODE | V3 | 2e8 |

MASS SPECTROMETER

TECHNICAL FIELD

The present invention relates to a mass spectrometer, and more specifically, to a technique for detecting ions in a mass spectrometer.

BACKGROUND ART

Secondary electron multipliers have been commonly used as an ion detector in a mass spectrometer. Systems for detecting ions with a secondary electron multiplier can be roughly divided into two types: an analog detection system and a pulse-count detection system.

In the analog detection system, a DC voltage is obtained as a detection value by integrating faint current-pulse signals outputted from the ion detector. This system can detect ions even when the gain of the ion detector is set at a low value. Therefore, an output saturation in the ion detector will not occur easily, which is advantageous for an expansion of the dynamic range in the case of detecting high-concentration components. However, this detection system is easily affected by electric noise, and therefore, has a disadvantage in terms of the signal-to-noise ratio in the case of detecting low-concentration components.

On the other hand, in the pulse-count detection system, faint current-pulse signals outputted from the ion detector are amplified and compared with a predetermined threshold in a comparator to generate pulse signals having a predetermined wave height, and those pulse signals are counted to obtain a count value as the detection value. This detection system is not affected by electric noise whose magnitude is smaller than the predetermined threshold, and therefore, is advantageous in terms of the signal-to-noise ratio within a low-concentration range. However, due to some constraints, such as the pulse width (normally, about 10 nsec) of the faint current-pulse signals outputted from the ion detector as well as the dead time in the waveform processing circuit in the subsequent stage, omissions occur in the counting process when there is a considerable amount of ions entering the ion detector. Therefore, there is a certain limit of the dynamic range within a high-concentration range.

For example, a mass spectrometer used in a liquid chromatograph mass spectrometer (LC-MS) is required to have a high level of quantification performance for a trace amount of component. In this type of mass spectrometer, the pulse-count system, which exhibits an excellent ion-detection accuracy within a low-concentration range, is normally used. However, the use of a normal pulse-count system causes the problem of the narrow dynamic range. To deal with this problem, techniques for expanding the dynamic range within a high-concentration range in the case of using a pulse-count system have been proposed.

Patent Literature 1 discloses a method for expanding the dynamic range within a high concentration range in a pulse-count system by correcting pulse-count values using a dead-time correction factor determined according to the count rate.

In an ion detection system disclosed in Patent Literature 2, an amplifier for pulse-count detection and an amplifier for analog detection arranged parallel to each other are connected to the current-signal output terminal of a secondary electron multiplier. The pulse-count detection and the analog detection are preformed in parallel, regardless of the magnitude of the output from the secondary electron multiplier. When the amount of ions is so small that the output voltage of the amplifier for analog detection does not exceed a predetermined value, the detection value by the pulse-count detection system is adopted, whereas the detection value by the analog detection system is adopted when the amount of ions is increased to such a level that the output voltage of the amplifier for analog detection exceeds the predetermined value. The ratio between the analog detection value and the pulse-count value is stored beforehand as a conversion factor in the CPU. Analog detection values are converted to pulse-count values by using this conversion factor.

CITATION LIST

Patent Literature

Patent Literature 1: U.S. Pat. No. 9,991,104 B
Patent Literature 2: JP H6-181046 A
Patent Literature 3: JP 2011-14481 A
Patent Literature 4: US 20150325420 A

SUMMARY OF INVENTION

Technical Problem

The method described in Patent Literature 1 can expand the dynamic range of the pulse-count system even in the case where the amount of ions entering the ion detector is increased to a certain extent. However, if the amount of ions entering the ion detector is further increased to such an extent that the pulse signals outputted from the ion detector cannot be resolved in the temporal direction and the pulse-count value has been saturated, it is no longer possible to correct the value. That is to say, the expansion of the dynamic range within a high-concentration range by this method is constrained by a fundamental limitation of the pulse-count detection.

By comparison, in the method described in Patent Literature 2, the detection value by the pulse-count detection system is practically unused in the case where the amount of ions entering the ion detector is large. Therefore, unlike the method described in Patent Literature 1, there is no influence of the saturation of the pulse-count value. However, this method has the following problem:

The gain of an ion detector, such as a secondary electron multiplier, depends on the detector voltage given to the ion detector. As disclosed in Patent Literature 3, in the pulse-count detection system, the detector voltage is normally set within the plateau region, i.e., a region where the pulse-count value is roughly flattened with respect to a change in detector voltage. By comparison, in the analog detection system, the higher the gain of the ion detector is, i.e., the higher the detector voltage is, the larger the detection value becomes and the more likely the saturation within a high-concentration range is to occur. Therefore, when it is necessary to ensure a sufficient dynamic range within a high-concentration range, the detector voltage should not be extremely high. From these reasons, the detector voltage may possibly be changed as needed by a manual adjustment by a user, or by an automatic tuning. When the gain of the ion detector is changed due to a change in the detector voltage, it becomes impossible to determine an accurate pulse-count value from an analog detection value by using the conversion factor stored in the CPU.

The present invention has been developed to solve this problem. One primary objective is to provide a mass spectrometer capable of accurately detecting the amount of ions over a wide concentration range of from low to high concentrations even after the detector voltage given to the ion detector has been changed.

Solution to Problem

One mode of the mass spectrometer according to the present invention developed for solving the previously described problem includes:
- an ion detector configured to generate a current-pulse signal corresponding to an incident ion, with a gain corresponding to a detector voltage;
- a voltage-generating section configured to give the detector voltage to the ion detector;
- a branching section configured to divide, into a plurality of branches, a voltage-pulse signal which is based on the current-pulse signal taken from an anode of the ion detector;
- a pulse-counting section configured to output a pulse-count value by detecting, by a pulse-count method, the voltage pulse signal in one of the branches formed by the branching section;
- an analog detection section configured to output an analog detection value by detecting, by an analog detection method, the voltage-pulse signal in another one of the branches formed by the branching section;
- a conversion-information storage section which holds conversion information showing a relationship between a predetermined pulse-count value and a corresponding analog detection value in a situation in which the pulse-count value by the pulse-counting section is unsaturated, under the detector voltage given from the voltage-generating section to the ion detector when a measurement is performed; and
- a converted-count-value calculation section configured to calculate a converted count value as an alternative detection value to the pulse-count value by the pulse-counting section when the pulse-count value by the pulse-counting section or the analog detection value by the analog detection section obtained by a measurement exceeds a predetermined value, using the analog detection value obtained by the measurement and the conversion information held in the conversion-information storage section.

Advantageous Effects of Invention

In the previously described mode of the mass spectrometer according to the present invention, even after the detector voltage has been changed so as to change the gain of the ion detector, the converted count value can be determined with a high level of accuracy from the analog detection value by using the conversion information corresponding to the detector voltage after the change. Therefore, even after the detector voltage has been changed, ions can be accurately detected over a wide concentration range from low to high concentrations, and the detection value corresponding to the amount of ions can be obtained.

BRIEF DESCRIPTION OF DRAWINGS

FIG. 2 is a schematic block configuration diagram of an ion detector and a detection-value generation unit in the mass spectrometer according to the present embodiment.

FIGS. 3A and 3B are diagrams showing one example of the relationship between the amount of ions entering an ion detector and the pulse-count value as well as the analog detection value, respectively, based on a measured example.
FIG. 4 is a diagram showing the relationship between the amount of ions entering an ion detector and the pulse-count value in the mass spectrometer according to the present embodiment.

DESCRIPTION OF EMBODIMENTS

[Mass Spectrometer According to One Embodiment]

Figure 1:
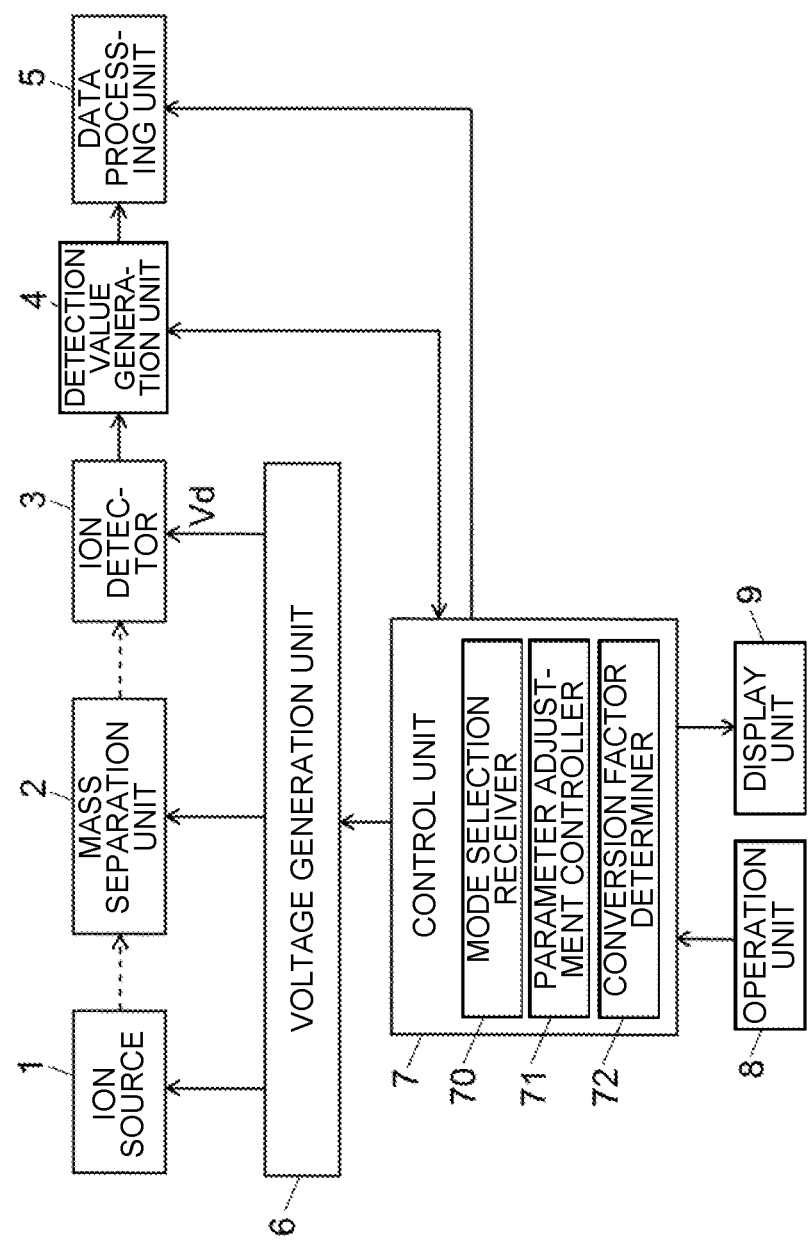
FIG. 1 is a schematic block configuration diagram of a mass spectrometer according to one embodiment of the present invention.

A mass spectrometer as one embodiment of the present invention is hereinafter described with reference to the attached drawings.
FIG. 1 is a schematic block configuration diagram of the mass spectrometer according to the present embodiment. FIG. 2 is a schematic block configuration diagram of a detection-value generation unit 4 in FIG. 1.
As shown in FIG. 1, this mass spectrometer includes an ion source 1, mass separation unit 2, ion detector 3, detection-value generation unit 4, data processing unit 5, voltage generation unit 6, control unit 7, operation unit 8 and display unit 9.
The ion source 1 ionizes components (compounds) in an introduced sample. There is no specific limitation on the ionization method. For example, in the case of a liquid sample, an electrospray ionization method or atmospheric pressure chemical ionization method can be used. In the case of a gas sample, an electron ionization method or chemical ionization method can be used. An ionization technique which employs a laser light, electron beam or other types of radiation can also be used, such as a matrix-assisted laser desorption/ionization method.
Ions originating from a sample component produced by the ion source 1 are introduced into the mass separation unit 2. Within this mass separation unit 2, the ions are separated from each other according to their mass-to-charge ratios (m/z). There is also no specific limitation on the type and configuration of the mass separation unit 2. For example, a quadrupole mass filter, time-of-flight mass separator or ion trap can be used as the mass separation unit 2. The mass separation unit 2 may additionally have the function of dissociating an ion into product ions. That is to say, it may have the configuration of a triple quadrupole including a collision cell for dissociating an ion by a collision induced dissociation or similar process, or a configuration for performing both the ion selection and the ion dissociation by an ion trap.

The ions separated from each other according to their m/z values in the mass separation unit 2 enter the ion detector 3. The ion detector 3 generates a faint current-pulse signal corresponding to each incident ion. Typically, the ion detector 3 may include a conversion dynode and a secondary electron multiplier.

As will be detailed later, the detection-value generation unit 4 performs predetermined processing on the faint pulse signals outputted from the ion detector 3, to generate a detection value corresponding to the amount of ions which have entered the ion detector 3. The data processing unit 5 receives the detection value from the detection-value generation unit 4 and performs predetermined data processing. In the data processing unit 5, for example, a mass spectrum covering a predetermined m/z range can be created based on the detection values obtained when an m/z scan across the predetermined m/z range was performed in the mass separation unit 2.

The voltage generation unit 6 applies predetermined voltages to the ion source 1, mass separation unit 2 and ion detector 3, respectively, under the control of the control unit 7, so as to perform operations for a mass spectrometric analysis as described earlier. The control unit 7 is configured to perform the control for the mass spectrometric analysis and includes, as its characteristic functional blocks, a mode selection receiver 70, parameter adjustment controller 71 and conversion factor determiner 72.

The data processing unit 5 and the control unit 7 can be constructed by using a personal computer as a hardware resource, in which the functional blocks in the data processing unit 5 and the control unit 7 can be embodied by executing, on the personal computer, dedicated control-and-processing software installed in the same computer.

As shown in FIG. 2, the detection-value generation unit 4 includes a transimpedance amplifier 40, signal-branching section 41, integrating circuit 42, comparator 43, analog-to-digital converter (ADC) 44, counter 45 and dynamic-range (DR) expansion processor 46. The DR expansion processor 46 includes a conversion factor storage section 461, converted-count-value calculator 462 and detection value selector 463 as its functional blocks.

The gain of the secondary electron multiplier included in the ion detector 3 depends on the detector voltage Vd applied from the voltage generation unit 6. In normal cases, the detector voltage Vd is set so as to provide a gain with which voltage-pulse signals derived from the faint current-pulse signals outputted from the anode 30 of the ion detector 3 can be properly detected by a pulse-count detection method. Details will be described later.

When an ion enters the ion detector 3 to which the detector voltage is thus given, a corresponding faint current-pulse signal is produced from the anode 30. This current-pulse signal undergoes current-to-voltage conversion in the transimpedance amplifier 40 and becomes a voltage-pulse signal. The value of the resistor which determines the gain of the transimpedance amplifier 40 can be appropriately selected within a range of approximately 1 kΩ to 50 kΩ. The current-pulse signal produced from a secondary electron multiplier normally has a narrow pulse width of approximately 5 to 10 nsec. Therefore, in order to correctly count pulses in the subsequent stage, it is preferable to select the resistance value so that this sharp pulse-signal waveform can be amplified with a minimum loss of its sharpness. As for the trans impedance amplifier 40, existing amplifiers as described in Patent Literature 4 (or other related documents) can be used.

The voltage-pulse signal outputted from the transimpedance amplifier 40 is divided into two branches in the signal-branching section 41. One branch is connected to one of the input terminals of the comparator 43, while the other branch is connected to the input of the integrating circuit 42. The other input terminal of the comparator 43 receives a predetermined threshold voltage Vth. The comparator 43 compares the voltage-pulse signal with the threshold voltage Vth and outputs a pulse signal having a predetermined wave height if the former signal is equal to or higher than the latter. The wave height of the voltage-pulse signal inputted to the comparator 43 changes from pulse to pulse. If the wave height exceeds the threshold voltage Vth, the output of the comparator 43 will be a binary signal with a constant wave height, i.e., a digital signal. This binary pulse signal is sent to the counter 45. The counter 45 tallies the number of input pulse signals within a unit length of time and outputs the count value. The counter 45 is reset every time the unit length of time elapses. This count value corresponds to the detection value by the pulse-count detection method.

Meanwhile, the integrating circuit 42 integrates and amplifies the inputted voltage-pulse signals for the unit length of time, to output an analog voltage value. This analog voltage value is also reset every time the unit length of time elapses. The analog voltage value outputted from the integrating circuit 42 is digitized in an analog-to-digital converter 44. The aforementioned analog voltage value is a detection value by the analog detection method. A value obtained by digitizing this analog voltage value is also hereinafter called the analog detection value.

The upper limit of the output voltage of the integrating circuit 42 is limited by the power-supply voltage of the amplifier included in the integrating circuit 42. Its upper limit is normally within a range of approximately 3.3 to 15 V. Accordingly, the gain of the integrating circuit 42 should be appropriately designed so that the output voltage of the integrating circuit 42 for a desired amount of ions will not be saturated. As one example, the integrating circuit 42 used in the mass spectrometer according to the present embodiment is an operational amplifier with an output voltage of 5 Vmax. The gain of the integrating circuit 42 is determined so that the output voltage will be 3 V when the amount of ions is 3e8 ($=3 \times 10^8$) [cps], which corresponds to the intended upper limit of the dynamic range.

As described earlier, in the mass spectrometer according to the present embodiment, a detecting operation by an analog detection method and a detecting operation by a pulse-count detection method are carried out in parallel based on faint current-pulse signals outputted from the single anode 30 in the ion detector 3, whereby both types of detection values, i.e., a pulse-count value and an analog detection value, are obtained.

In principle, the configuration shown in FIG. 2 could be modified so that the signal will be divided into branches at the input of the transimpedance amplifier 40. In that case, however, the output current from the ion detector 3 must be divided into two branches, one for the pulse-counting and the other for the analog detection, which is unfavorable in terms of the signal-to-noise ratio (or the like). By comparison, in the present embodiment, the current signal is initially converted into the voltage signal in the transimpedance amplifier 40, and this voltage signal is subsequently divided into two signals, whereby a qualitative deterioration of the signal due to the branching can be avoided.

The DR expansion processor 46 uses the two aforementioned detection values to obtain a detection value with a wider dynamic range than can be achieved by the pulse-count detection method. The principle of the DR expansion is hereinafter described.

FIGS. 3A and 3B are schematic diagrams showing one example of the relationship between the amount of ions entering the ion detector 3 and the pulse-count value as well as the analog detection value. As shown in FIG. 3A, the relationship between the amount of ions and the pulse-count value in the present example is almost linear within a range equal to or less than 1e7 [cps], whereas an omission of ions in the counting process occurs when the amount of ions exceeds 1e7 [cps]. By comparison, the relationship between the amount of ions and the analog detection value, as shown in FIG. 3B, is almost linear until the amount of ions reaches 3e8 [cps] at which the ion detector 3 itself becomes saturated.

As already noted, the pulse-count method has a better signal-to-noise ratio when the amount of ions is low. Accordingly, in the mass spectrometer according to the present embodiment, as shown in FIG. 4, the pulse-count value is directly used when the amount of ions is within a range where the pulses can be correctly counted (1e7 [cps] or less), whereas the analog detection value is used for the amount of ions exceeding the aforementioned range so as to expand the dynamic range. Within the range of the amount of ions where the analog detection value is used, a converted count value is used which is calculated by multiplying a measured analog detection value by a conversion factor obtained beforehand by a measurement for an amount of ions which causes no saturation of the pulse count (i.e., no omission in the counting process). For example, if the analog detection value for a pulse-count value of 1e7 [cps] was 0.1 V, the conversion factor is 1e7 [cps]/0.1[V]=1e6.

In the mass spectrometer according to the present embodiment, as will be described later for example, a conversion factor is calculated in the conversion factor determiner 72 of the controller 7 based on a measurement for a standard sample carried out in the device-tuning process (or the like), and is stored in the conversion factor storage section 461. Alternatively, for example, the device manufacturer may experimentally determine this conversion factor and store it in the conversion factor storage section 461. In that case, the conversion factor determiner 72 is unnecessary.

In a measurement of a sample, an analog detection value and a pulse-count value are inputted to the DR expansion processor 46 in parallel in the previously described manner in response to an entry of ions into the ion detector 3. The converted-count-value calculator 462 determines whether or not the pulse-count value (or the analog detection value) is equal to or greater than a predetermined value. If the pulse-count value (or the analog detection value) is equal to or greater than the predetermined value, the converted-count-value calculator 462 multiplies the analog detection value by the conversion factor read from the conversion factor storage section 461 to obtain a converted count value. When the pulse count value (or analog detection value) is less than the predetermined value, the detection value selector 463 directly outputs the pulse-count value as the detection value. Otherwise, it outputs the converted count value calculated by the converted-count-value calculator 462 as the detection value in place of the pulse-count value.

Thus, as shown in FIG. 4, either a pulse-count value or a converted count value calculated by using an analog detection value and a conversion factor is selectively outputted as the detection value according to the amount of ions which have entered the ion detector 3.

The dynamic range of the detection value in this case is limited by the saturation of the output current from the ion detector 3. The saturation of the ion detector 3 is more likely to occur as the gain of the ion detector 3, or the detector voltage Vd applied from the voltage generation unit 6, becomes higher. Therefore, the detector voltage should be low from the viewpoint of increasing the upper limit of the dynamic range. On the other hand, in order to avoid omissions in the pulse-counting, the gain of the ion detector 3 must be set so that the voltage-pulse signal derived from the current-pulse signals outputted from the ion detector 3 will assuredly exceed the threshold voltage Vth. To this end, the detector voltage should be set at a sufficiently high level. That is to say, there is a trade-off between the prevention of the omissions in the pulse-counting (i.e., the assurance of sensitivity) and the expansion of the dynamic range when setting the detector voltage of the ion detector 3.

Figure 5:
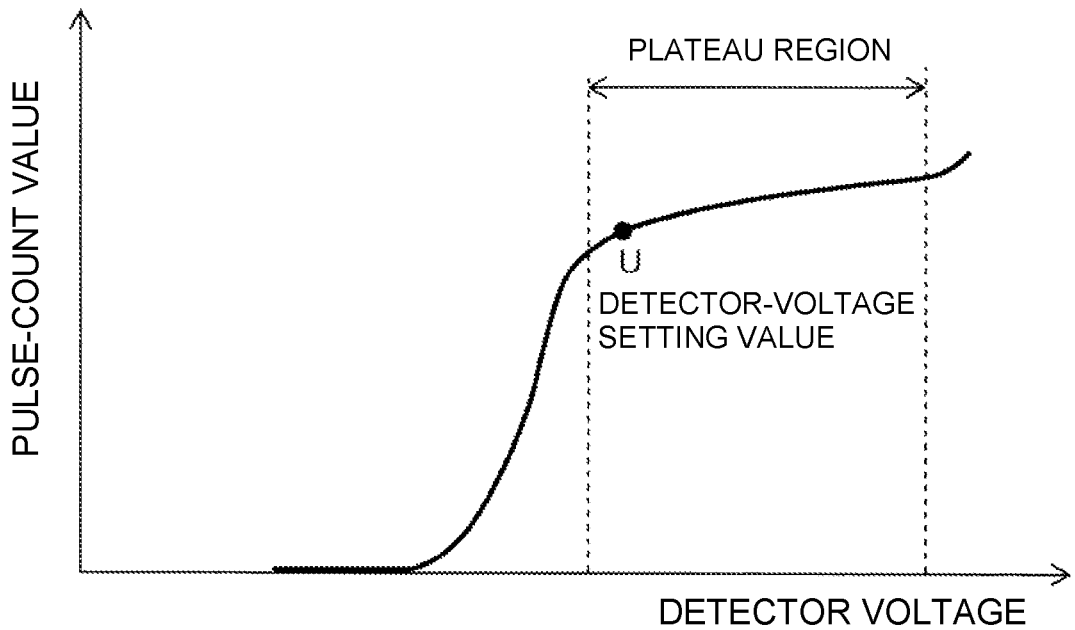
FIG. 5 is a diagram showing one example of the relationship between the detector voltage and the pulse-count value.

FIG. 5 is one example of the relationship between the detector voltage and the pulse-count value, called the "plateau curve". In general, mass spectrometers are configured to determine this characteristic curve in the device-tuning process and set the detector voltage within the plateau region where the pulse-count value is roughly flattened. Additionally, the detector voltage is normally set at a relatively low value within the plateau region (e.g., at a value corresponding to point U in FIG. 5) since the use of a low detector voltage is preferable for extending the operation life of the secondary electron multiplier. However, whether or not a desired dynamic range will be obtained with the thus set detector voltage is unknown, and no consideration has conventionally been made from this point of view.

Figure 6:
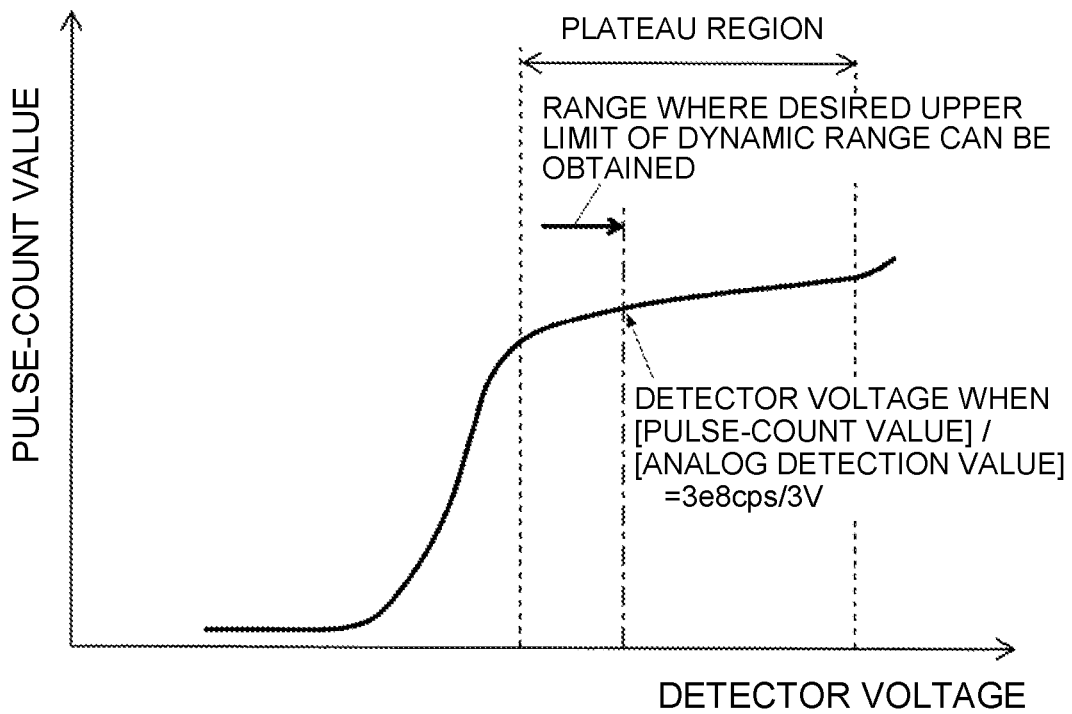
FIG. 6 is a diagram showing a relationship between the plateau region and the area where a desired upper limit of the dynamic range is obtained.

By comparison, in the mass spectrometer according to the present embodiment, a limitation (upper limit) for the setting of the detector voltage is defined so as to prevent the saturation of the ion detector 3 at the upper limit of the desired dynamic range. For example, when the amount of ions corresponding to 3e8 [cps] should be the upper limit of the dynamic range, the parameter adjustment controller 71 holds an analog detection value corresponding to that upper limit (e.g., 3 V) in its internal memory and sets the detector voltage within the plateau region so that the ratio between the pulse-count value and the analog detection value for a change in detector voltage will fall within a predetermined range (e.g., equal to or less than 3e8 [cps]/3 [V]; see FIG. 6). By this method, the upper limit of the dynamic range can be certainly set at the desired value.

However, depending on the characteristics of the secondary electron multiplier, it may be impossible to set the detector voltage under the previously described conditions. Specifically, for example, the plateau curve may be shifted toward the higher-voltage area due to an individual difference of the device (e.g., a higher noise level), in which case the voltage corresponding to the upper limit of the desired dynamic range may possibly be lower than the lower limit of the plateau region. In this case, if the detector voltage is set within the plateau region so as to perform the counting without omissions, the upper limit of the dynamic range will be lower than the desired value. To address this problem, the mass spectrometer according to the present embodiment has three detector-operation modes which are different from each other in detector voltage, i.e., a sensitivity-oriented mode, balance mode and dynamic-range-oriented mode, from which users can select one mode beforehand.

Figures 7, 8:
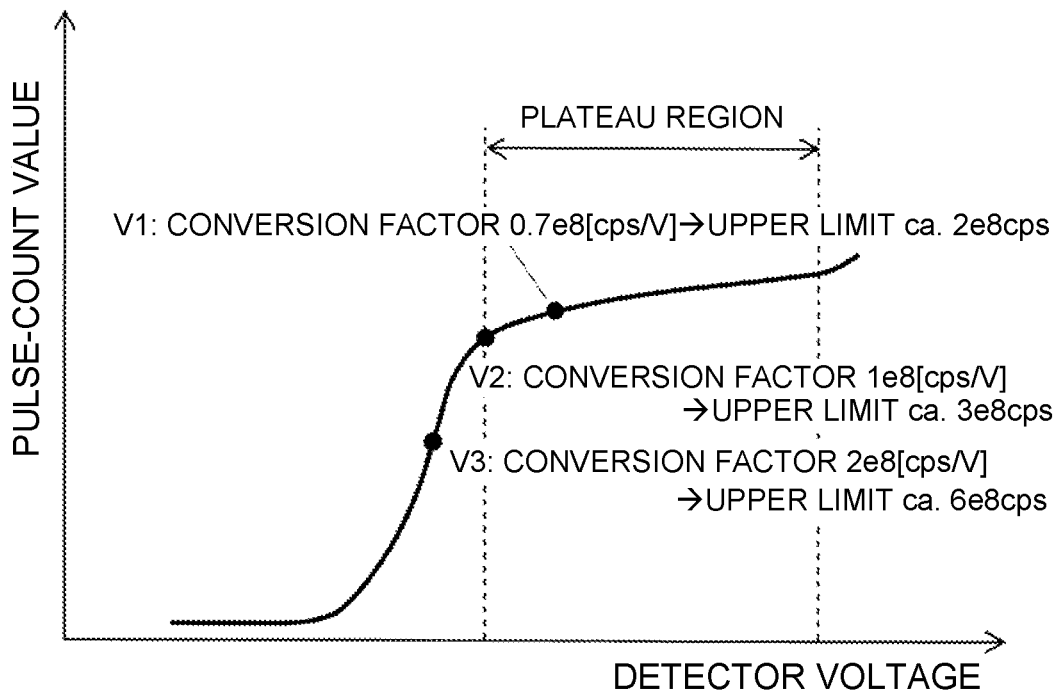
FIG. 7 is a diagram showing the relationship between the detector voltage and the plateau region for each detector-operation mode in the mass spectrometer according to the present embodiment.
FIG. 8 is a table showing one example of the detector voltage and the conversion factor in each detector-operation operation mode.

FIG. 7 is a diagram showing three values of the detector voltage which respectively correspond to the three detector-operation modes on the plateau curve. FIG. 8 is a table showing one example of the detector-voltage values and the conversion factors corresponding to the three detector-operation modes. As shown in FIG. 7, the detector voltage V2 corresponding to the balance mode has a value in the vicinity of the lower limit of the plateau region, while the detector voltage V1 corresponding to the sensitivity-oriented mode has a larger value than V2 and is located within the plateau region. On the other hand, the detector voltage V3 corresponding to the dynamic-range-oriented mode is lower than V2 and deviates from the plateau region.

Within the plateau region, when the detector voltage is increased, the pulse-count value barely increases, whereas the analog detection value significantly increases. Accordingly, setting the detector voltage at a higher value within the plateau region causes the dynamic range of the detector to be narrower. Therefore, although the sensitivity-oriented mode has a slightly narrower dynamic range than the other modes, the sensitivity-oriented mode ensures that a voltage-pulse signal which exceeds the threshold voltage Vth will be obtained for an entry of an ion into the ion detector 3. Consequently, a high level of sensitivity can be achieved. On the contrary, although the dynamic-range-oriented mode is disadvantageous in terms of sensitivity since the voltage-pulse signal produced in response to an entry of an ion into the ion detector 3 may not exceed the threshold voltage Vth, this mode allows for an increase in the upper limit of the dynamic range as compared to the other modes.

For example, in the device-tuning process, the conversion factor determiner 72 determines the conversion factor for each of the three detector-operation modes. The conversion factor storage section 461 stores the conversion factors and relates them to the corresponding modes. When a measurement is to be performed, the user performs a predetermined operation using the operation unit 8, whereupon the mode selection receiver 70 displays, on the display unit 9, a screen for selecting one of the three detector-operation modes. The user views this screen and performs an operation for selecting one of those modes by the operation unit 8. According to this operation, the mode selection receiver 70 determines the detector voltage. The voltage generation unit 6 receives an indication of the detector voltage from the control unit 7 and generates a DC voltage according to the indication, which is given to the ion detector 3 as the detector voltage Vd. This determines the gain of the ion detector 3.

Meanwhile, the control unit 7 sends the information of the selected mode to the DR expansion processor 46. According to this information, the converted-count-value calculator 462 obtains the conversion factor corresponding to the specified mode from the conversion factor storage section 461 and determines the converted count value by multiplying the analog detection value obtained in the measurement by that conversion factor. In this manner, regardless of which detector-operation mode is selected, an accurate converted count value can be determined from an analog detection value by using the conversion factor corresponding to the selected mode.

The mass spectrometer according to the present embodiment allows the conversion factors to be stored in the conversion factor storage section 461 at any point in time before the measurement is performed. Therefore, as noted earlier, the device manufacturer may experimentally determine conversion factors and store them in the conversion factor storage section 461 before the device is provided to users. However, it should be noted that the characteristics of the ion detector 3 (and other factors) may possibly change with the use of the device, which may also cause a corresponding change in the appropriate value of the conversion factor. To deal with this problem, for example, when an adjustment is performed for optimizing the voltages given to the ion transport optical systems, quadrupole mass filters, ion detector 3 and other elements in the device, it is preferable to determine the conversion factors under the adjusted conditions, store them in the conversion factor storage section 461, and use them in the subsequent measurements.

Specifically, the user performs a predetermined operation from the operation unit 8 at an appropriate point in time. Then, the parameter adjustment controller 71 performs an auto-tuning operation which includes repeating a measurement using a standard sample while changing previously specified parameters, such as the voltages given to the related sections. This auto-tuning operation may be automatically carried out, for example, at the start of the device. It may also be automatically carried out at a specified timing, e.g., every time the device has been used for a predetermined length of time.

In the auto-tuning operation performed by the parameter adjustment controller 71, the detector voltage given to the ion detector 3 is varied in predetermined steps, and a pulse-count value for the standard sample is obtained at each step to determine the plateau curve. From the determined plateau curve, the plateau region is defined, where, for example, V2 is set at the lower limit of the plateau region, V1 (>V2) is set within a range where a desired dynamic range can be obtained, and V3 (<V2) is set at a position where the count value is a predetermined percentage lower than the pulse-count value within the plateau region. In this manner, the detector voltage corresponding to each detector-operation mode can be determined. The conversion factor determiner 72 can determine the conversion factor from each determined detector voltage and the corresponding pulse-count value.

The task of determining the plateau curve and recalculating the detector voltage and the conversion factor may be performed every time the tuning of the device is performed, although the recalculation does not always need to be performed in every tuning of the device. For example, the detector voltage and the conversion factor may be recalculated every time the device-tuning has been performed a predetermined number of times, or the detector voltage and the conversion factor may be recalculated when the operation time of the device since the last resetting of the detector voltage and the conversion factor has exceeded a specified period of time.

Measured Example

Figure 9:
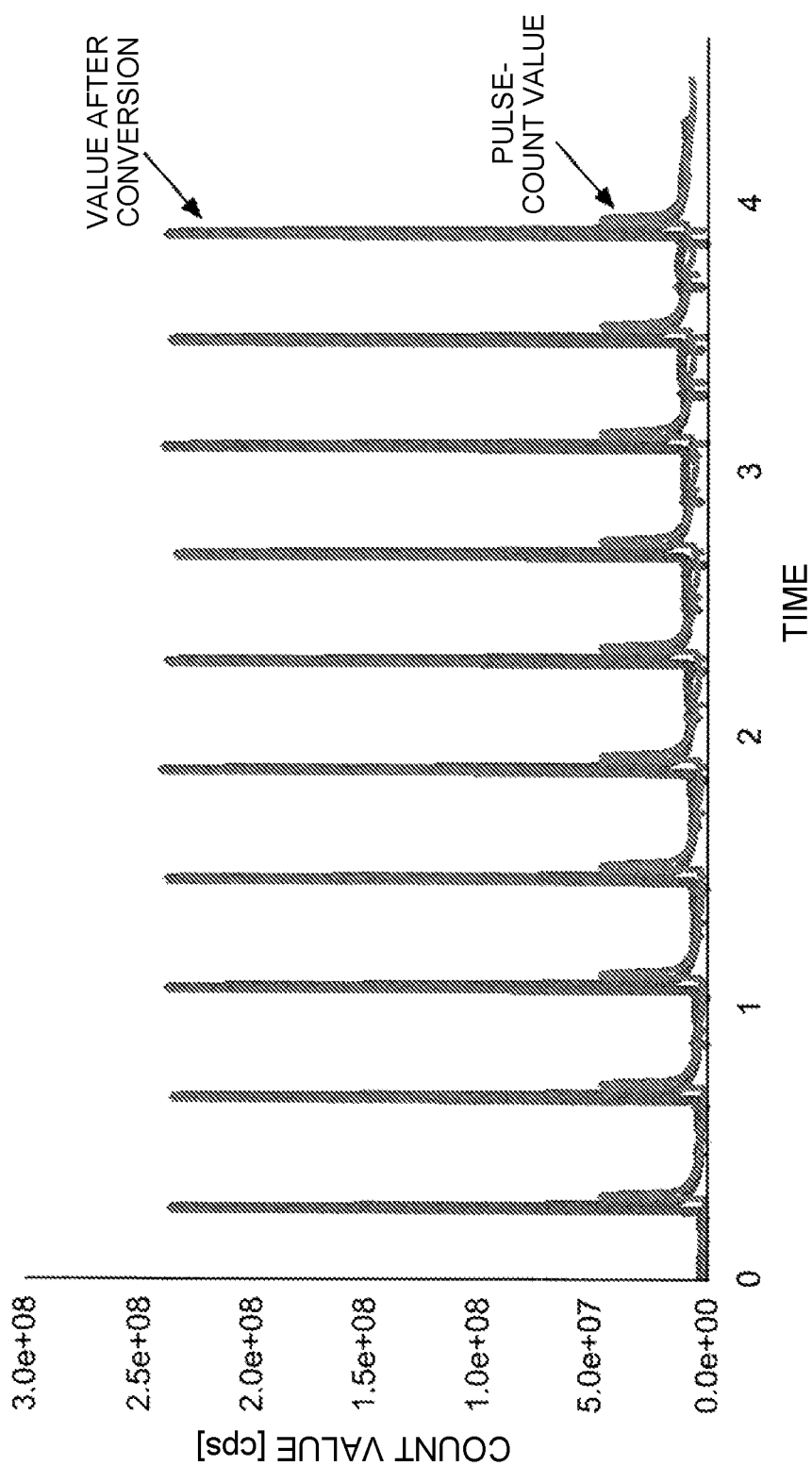
FIG. 9 is a diagram showing a measured example of a chromatogram obtained with an LC-MS using the mass spectrometer according to the present embodiment.

FIG. 9 is an example of a chromatogram obtained in an actual measurement in which a high-concentration liquid sample was repeatedly injected 10 times into the mass spectrometer according to the present embodiment in a flow injection analysis. The concentration of the sample was so high as to cause the saturation of the pulse-count value.

As shown in FIG. 9, the detection value by a conventional pulse-count detection system was saturated when the amount of ions was at around 5e7 [cps]. By comparison, an amount of ions which exceeds 2e8 [cps] was satisfactorily detected by the technique in the mass spectrometer according to the present embodiment. Thus, the mass spectrometer according to the present embodiment can expand the dynamic range of the detection value within a high-concentration range.

[Problem Related to Deterioration of Ion Detector]

Figure 10:
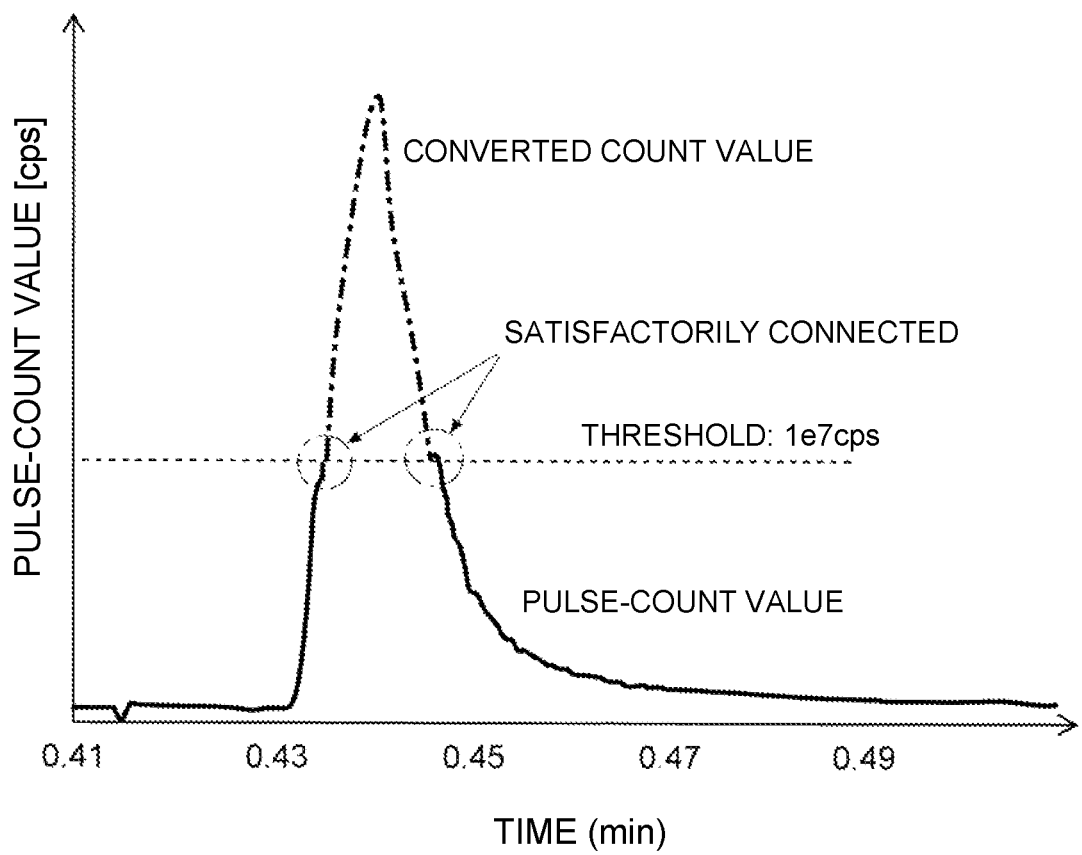
FIG. 10 is a diagram showing one example of an ideal chromatogram peak obtained with an LC-MS using the mass spectrometer according to the present embodiment.

In the mass spectrometer according to the previous embodiment, the threshold at which the type of detection value should be changed is set at 1e7 [cps] in terms of the amount of ions: The pulse-count value is directly used when the pulse-count value is equal to or less than 1e7 [cps], while the converted count value is used when the pulse-count value exceeds 1e7 [cps]. FIG. 10 shows a chromatogram peak in the case where a sample having a concentration corresponding to an amount of ions which exceeds 1e7 [cps] was introduced. When the conversion factor is appropriately set, the connection between the pulse-count value and the converted count value will be more or less smooth, as shown in FIG. 10. Therefore, a satisfactory level of quantification performance is achieved when the component concentration is calculated from the peak area value, for example.

Figure 11:
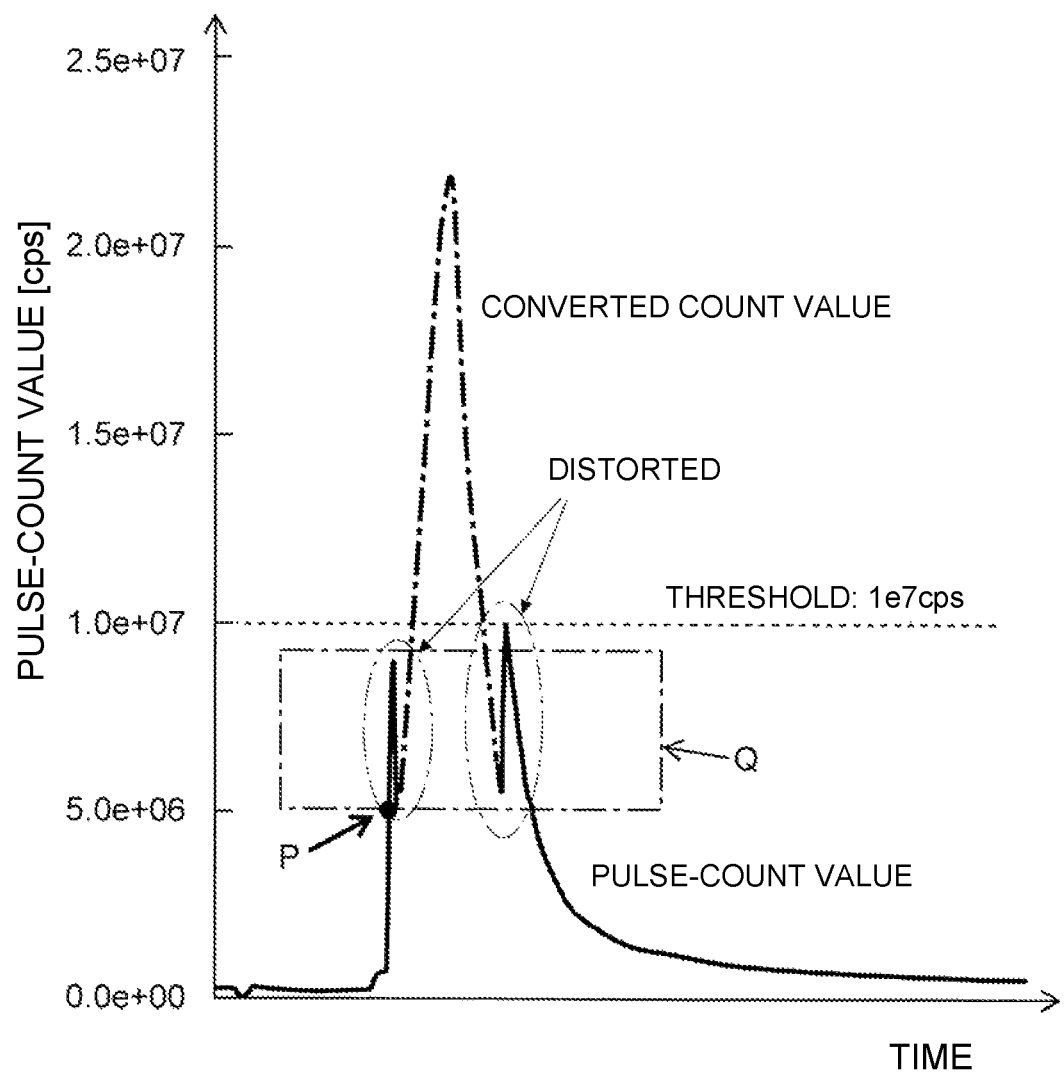
FIG. 11 is a diagram showing one example of a chromatogram peak obtained with an LC-MS using the mass spectrometer according to the present embodiment, in the case where the ion detector has been deteriorated.

However, as the secondary electron multiplier gradually deteriorates through a long-term use of the device, the output current signal for a specified amount of ions becomes lower and may possibly cause a situation in which the conversion factor is no longer appropriate. If a conversion factor obtained before the deterioration of the secondary electron multiplier is used in the calculation of a converted count value for the secondary electron multiplier which has deteriorated, the chromatogram peak will be distorted at the boundary section between the pulse-count value and the converted count value, as shown in FIG. 11. Such a distortion lowers the performance of the quantification of the component concentration.

In the previously described case where the conversion factor is recalculated in the device-tuning process and the stored information is thereby updated, the aforementioned distortion of the chromatogram peak can be avoided by increasing the updating frequency. However, the device-tuning is likely to cause contamination of an ion transport optical system or other related elements since the measurement of a standard sample is repeatedly performed. Furthermore, frequent tuning increases the burden of the user. It is also unfavorable in terms of the actual operation efficiency of the device. To address these problems, the configuration of the mass spectrometer according to the following modified example can be adopted in order to always use the latest conversion factor for the calculation of the converted count value, without increasing the frequency of the device tuning.

Modified Example

Figure 12:
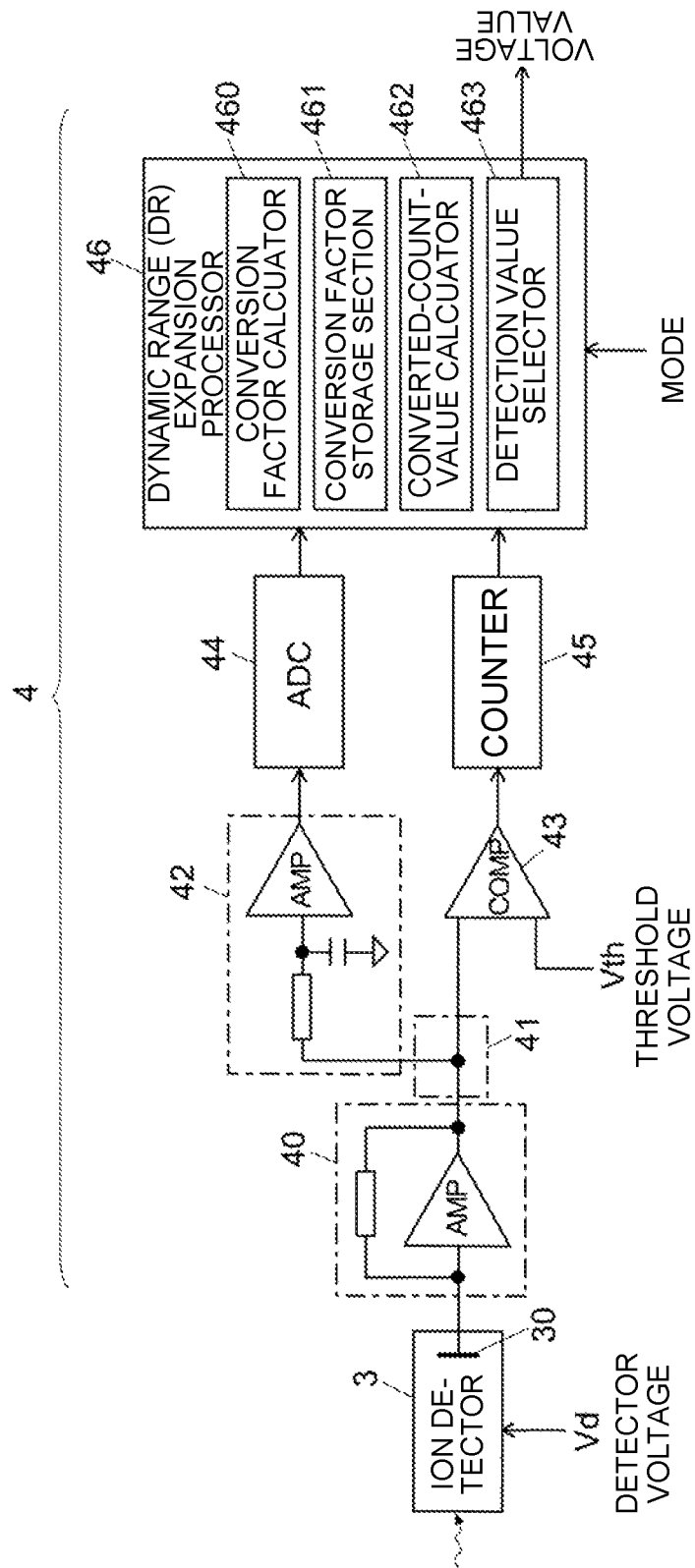
FIG. 12 is a schematic block configuration diagram of an ion detector and a detection-value generation unit in a mass spectrometer as a modified example.

FIG. 12 is a schematic block configuration diagram of the ion detector and the detection-value generation unit in a mass spectrometer as a modified example. The components identical to those shown in FIG. 2 are denoted by identical reference signs, and detailed descriptions of those components will be omitted. The DR expansion processor 46 in the present mass spectrometer includes a conversion factor calculator 460 as a functional block.

In the mass spectrometer according to the previous embodiment, the conversion factor is stored in the conversion factor storage section 461 no later than when a measurement for a target sample is carried out. By comparison, in the present mass spectrometer, while a measurement for a target sample is being performed, the conversion factor calculator 460 computes the conversion factor using data with ion intensities equal to or less than a predetermined value among the acquired data and saves the obtained conversion factor in the conversion factor storage section 461. Based on this conversion factor, the converted-count-value calculator 462 calculates the converted count value from the pulse-count value. That is to say, the present device determines the conversion factor and calculates the converted count value using that conversion factor while performing a measurement.

Figure 13:
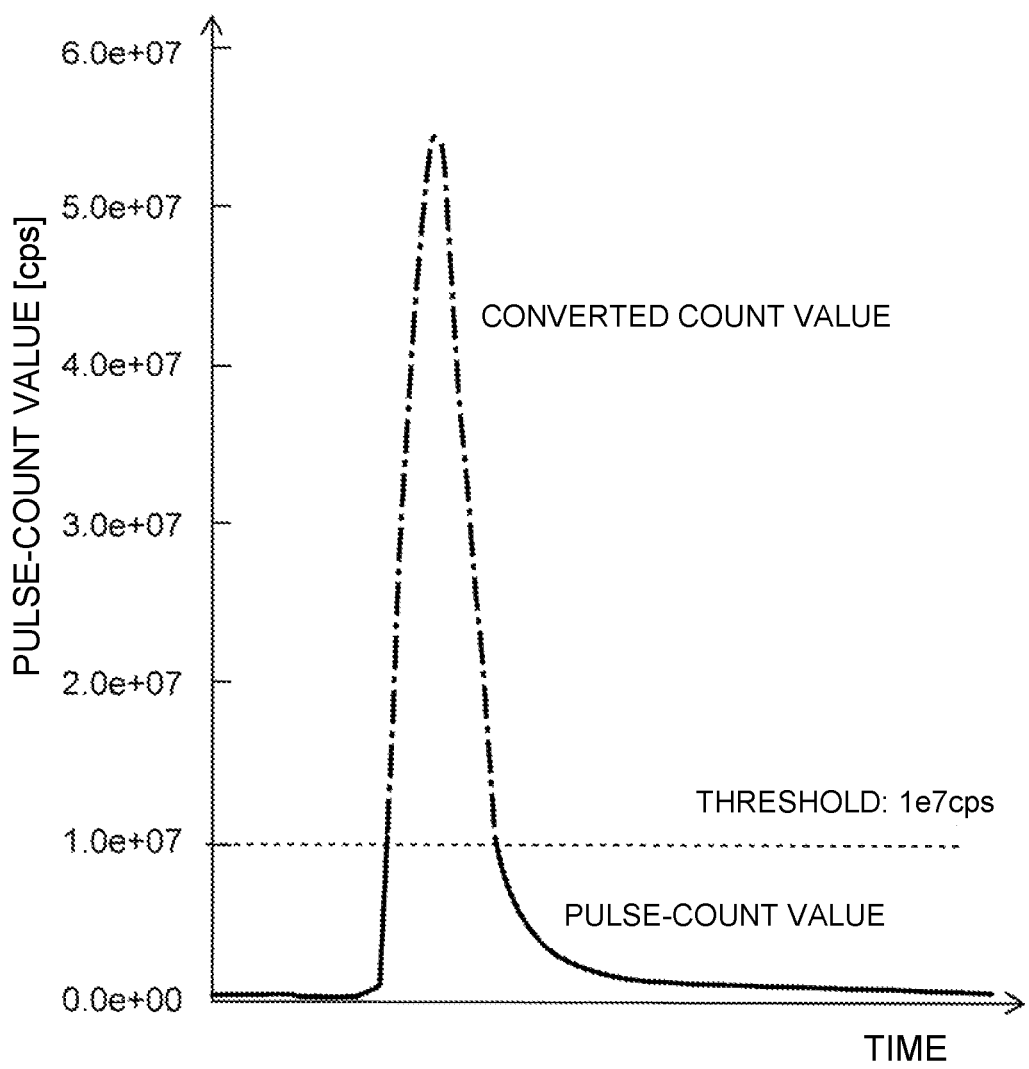
FIG. 13 is a diagram showing one example of a chromatogram peak obtained with an LC-MS using the mass spectrometer as the modified example.

For example, when the ion intensity (pulse-count value) which increases with the passage of time during the measurement as shown in FIG. 11 has reached a predetermined value (data point P in FIG. 11) equal to or lower than 1e7 [cps] at which the pulse count does not saturate, the conversion factor calculator 460 obtains the pulse-count value and the analog detection value at that point in time, and subsequently calculates the ratio of the two values to determine the latest conversion factor. The conversion factor thus obtained is the conversion factor value corresponding to the point in time of the acquisition of those data, and therefore, is more accurate since the deteriorated condition of the ion detector 3 at that point in time is reflected in it. This conversion factor is immediately stored in the conversion factor storage section 461. As shown in FIG. 11, when the measured ion intensity exceeds 1e7 [cps], the converted count value determined from the analog detection value using that conversion factor is adopted as the detection value. Since the detector voltage is normally unchanged throughout the measurement, the used conversion factor is the conversion factor under the detector voltage given to the ion detector 3 when the analog detection value to be subjected to the conversion was obtained. Accordingly, an appropriate conversion is performed in which the deteriorated condition of the ion detector 3 is reflected, so that a roughly smooth connection is achieved at a boundary of 1e7 [cps] which is the threshold separating the upper and lower portions of the chromatogram peak, as shown in FIG. 13. In other words, the distortion of the chromatogram peak is reduced.

The previously described device calculates the conversion factor in practically real time in the measurement and calculates the converted count value using this conversion factor. This is advantageous, for example, in that a practically distortion-free chromatogram peak which has been corrected by using an appropriate conversion factor can be drawn when the chromatogram is displayed in almost real time on the screen of the display unit 9 during the measurement.

The conversion process does not always need to be performed while the measurement is being performed; it is also possible to determine the conversion factor by post-processing after the completion of the measurement, calculate the converted count value from the analog detection value using that conversion factor, and replace the data forming the chromatogram peak with the calculated ones. In this case, the conversion factor can be calculated from a considerable number of data included within a specific range where the ion intensity does not exceed 1e7 [cps], e.g., the range Q in FIG. 11. As compared to the previously described case of calculating the conversion factor in substantially real time, the present method is advantageous in that the accuracy of the conversion factor itself can be improved, whereby the accuracy of the conversion using the conversion factor, and therefore, the accuracy of the ultimately obtained converted count value will also be improved.

It should be noted that the mass spectrometers according to the previous embodiment and its modified example are mere examples of the present invention, and any change, modification, addition or the likes appropriately made within the gist of the present invention will naturally be included within the scope of claims of the present application.

[Various Modes]

A person skilled in the art can understand that the previously described illustrative embodiment is a specific example of the following modes of the present invention.

(Clause 1) One mode of the mass spectrometer according to the present invention includes:
- an ion detector configured to generate a current-pulse signal corresponding to an incident ion, with a gain corresponding to a detector voltage;
- a voltage-generating section configured to give the detector voltage to the ion detector;
- a branching section configured to divide, into a plurality of branches, a voltage-pulse signal which is based on the current-pulse signal taken from an anode of the ion detector;
- a pulse-counting section configured to output a pulse-count value by detecting, by a pulse-count method, the voltage pulse signal in one of the branches formed by the branching section;
- an analog detection section configured to output an analog detection value by detecting, by an analog detection method, the voltage-pulse signal in another one of the branches formed by the branching section;
- a conversion-information storage section which holds conversion information showing a relationship between a predetermined pulse-count value and a corresponding analog detection value in a situation in which the pulse-count value by the pulse-counting section is unsaturated, under the detector voltage given from the voltage-generating section to the ion detector when a measurement is performed; and
- a converted-count-value calculation section configured to calculate a converted count value as an alternative detection value to the pulse-count value by the pulse-counting section when the pulse-count value by the pulse-counting section or the analog detection value by the analog detection section obtained by a measurement exceeds a predetermined value, using the analog detection value obtained by the measurement and the conversion information held in the conversion-information storage section.

In the mass spectrometer according to Clause 1, even after the detector voltage has been changed so as to change the gain of the ion detector, the converted count value can be determined with a high level of accuracy from the analog detection value by using the conversion information corresponding to the detector voltage after the change. Therefore, even after the detector voltage has been changed, ions can be accurately detected over a wide concentration range from low to high concentrations, and the detection value corresponding to the amount of ions can be obtained.

(Clause 2) In the mass spectrometer according to Clause 1:
- the conversion-information storage section may hold a plurality of pieces of conversion information each of which corresponds to each of a plurality of detector-voltage values different from each other; and
- the converted-count-value calculation section may be configured to selectively obtain, from the conversion-information storage section, the conversion information corresponding to one detector-voltage value among the plurality of detector-voltage values given from the voltage-generating section to the ion detector when the measurement is performed, and to calculate the converted count value using the obtained conversion information.

Since the gain of the ion detector depends on the detector voltage, the saturation of the pulse-count value by the pulse-count detection method or that of the output of the ion detector itself also depends on the detector voltage. Therefore, there may be the case where the detector voltage should preferably be changed by an intentional adjustment or the case where the detector voltage is changed by an automatic adjustment. A change in the gain of the ion detector causes a change in the relationship between the pulse-count value and the analog detection value, which also causes a change in conversion factor. To deal with this situation, a plurality of conversion factors each of which corresponds to each of a plurality of selectable detector-voltage values are prepared in the mass spectrometer according to Clause 2, and the converted count value can be accurately determined by using an appropriate conversion factor corresponding to the detector voltage at the point in time.

(Clause 3) The mass spectrometer according to Clause 2 may further include a mode-selecting section configured to display a plurality of modes in a selectable form, including a sensitivity-oriented mode and a dynamic-range-oriented mode, and to receive a selection of one of the modes by a user, where:
- the voltage-generating section may have the function of changing the detector voltage given to the ion detector according to the mode selected by the mode-selecting section, where the detector voltage given when the dynamic-range-oriented mode is selected is lower than the detector voltage given when the sensitivity-oriented mode is selected; and
- the converted-count-value calculation section may be configured to obtain, from the conversion-information storage section, the conversion information corresponding to the detector voltage according to the mode selected by the mode-selecting section, and to calculate the converted count value.

In the mass spectrometer according to Clause 3, when the sensitivity-oriented mode is selected, the detector voltage is set at a relatively high level. Although this makes the analog detection value more likely to saturate within a high-concentration range, the increased gain of the ion detector reduces omissions in the pulse-counting within a low-concentration range, so that a high level of detection sensitivity can be achieved. On the other hand, when the dynamic-range-oriented mode is selected, the saturation of the analog detection value within a high-concentration range is less likely to occur, whereby the dynamic range of the detection value is expanded. Thus, the mass spectrometer according to Clause 3 allows the user to selectively perform a measurement with a high level of sensitivity or one with a wide dynamic range according to the purpose of the measurement, concentration of the sample subjected to the measurement or other related factors.

(Clause 4) The mass spectrometer according to any one of Clauses 1-3 may further include a saturation-reference-value storage section which stores a saturation reference value related to an analog detection value at which a saturation occurs in the output of the ion detector, where
- the voltage-generating section may be configured to set the detector voltage given to the ion detector, based on the pulse-count value, in such a manner that the analog detection value outputted from the analog detection section will not exceed the saturation reference value.

The mass spectrometer according to Clause 4 can adjust the detector voltage so that the intended upper limit of the dynamic range will be assuredly achieved.

(Clause 5) The mass spectrometer according to Clause 1 may further include a conversion-information acquisition section configured to calculate conversion information using a pulse-count value by the pulse-counting section and an analog detection value corresponding to the pulse-count value, and to save the conversion information in the conversion-information storage section, when both the pulse-count value and the analog detection value are obtained under the condition that the pulse-count value is unsaturated.

(Clause 6) In the mass spectrometer according to Clause 5,
the conversion-information acquisition may be configured to calculate the conversion information and to save the conversion information in the conversion-information storage section while a measurement is being performed; and
after the conversion information is saved in the conversion-information storage section while the measurement is being performed, when the pulse-count value by the pulse-counting section or the analog detection value by the analog detection section obtained by the measurement exceeds a predetermined value, the converted-count-value calculation section may be configured to output, as an alternative detection value to the pulse-count value by the pulse-counting section, the converted count value calculated by using the analog detection value obtained by the measurement and the conversion information held in the conversion-information storage section.

The mass spectrometer according to Clause 6 calculates the converted count value using conversion information calculated based on the data obtained while the measurement is being performed, not the conversion information prepared before the execution of the measurement. Accordingly, the conversion information used in the mass spectrometer according to Clause 6 reflects the condition of the ion detector at the point in time of the measurement, i.e., the detector gain corresponding to the deteriorated condition and the detector voltage, so that the converted count value can be more accurately calculated. Therefore, for example, when a chromatogram in which the ion intensity changes with time is created, the curve will show a satisfactory connection at the boundary section between the detection value based on the pulse-count value and the one based on the converted count value, so that the quantification performance will be improved in the case of calculating the component concentration based on the area of the chromatogram peak.

(Clause 7) In the mass spectrometer according to Clause 5,
after a measurement is performed, the conversion-information acquisition section may be configured to calculate the conversion information using the pulse-count value and the analog detection value obtained in the measurement, and to save the conversion information in the conversion-information storage section; and
after the conversion information is saved in the conversion information storage section, when the pulse-count value by the pulse-counting section or the analog detection value by the analog detection section obtained by the measurement exceeds a predetermined value, the converted-count-value calculation section may be configured to calculate the converted count value using the analog detection value obtained by the measurement and the conversion information held in the conversion-information storage section.

The mass spectrometer according to Clause 7 differs from the mass spectrometer according to Clause 6 in that the conversion information is not calculated while the measurement is being performed, but after the measurement is performed, based on the data obtained in the measurement. This conversion information is used to calculate the converted count value. Accordingly, the conversion information used in the mass spectrometer according to Clause 7 also reflects the condition of the ion detector at the point in time of the measurement, i.e., the detector gain corresponding to the deteriorated condition and the detector voltage, so that the converted count value can be more accurately calculated. Therefore, for example, when a chromatogram in which the ion intensity changes with time is created, the curve will show a satisfactory connection at the boundary section between the detection value based on the pulse-count value and the one based on the converted count value, so that the quantification performance will be improved in the case of calculating the component concentration based on the area of the chromatogram peak.

Furthermore, the mass spectrometer according to Clause 7 can easily calculate the conversion information using a number of data obtained when the pulse-count value by the pulse-counting section was unsaturated. Therefore, the converted count value can be more accurately determined, and the quantification performance will be even more improved.

REFERENCE SIGNS LIST

1 . . . Ion Source
2 . . . Mass Separation Unit
3 . . . Ion Detector
30 . . . Anode
4 . . . Detection-Value Generation Unit
40 . . . Transimpedance Amplifier
41 . . . Signal-Branching Section
42 . . . Integrating Circuit
43 . . . Comparator
44 . . . Analog-to-Digital Converter
45 . . . Counter
46 . . . Dynamic-Range (DR) Expansion Processor
461 . . . Conversion Factor Storage Section
462 . . . Converted-Count-Value Calculator
463 . . . Detection Value Selector
5 . . . Data Processing Unit
6 . . . Voltage Generation Unit
7 . . . Control Unit
70 . . . Mode Selection Receiver
71 . . . Parameter Adjustment Controller
72 . . . Conversion Factor Determiner
8 . . . Operation Unit
9 . . . Display Unit

The invention claimed is:
1. A mass spectrometer, comprising:
an ion detector configured to generate a current-pulse signal corresponding to an incident ion, with a gain corresponding to a detector voltage;
a voltage-generating section configured to give the detector voltage to the ion detector;
a branching section configured to divide, into a plurality of branches, a voltage-pulse signal which is based on the current-pulse signal taken from an anode of the ion detector;

a pulse-counting section configured to output a pulse-count value by detecting, by a pulse-count method, the voltage pulse signal in one of the branches formed by the branching section;

an analog detection section configured to output an analog detection value by detecting, by an analog detection method, the voltage-pulse signal in another one of the branches formed by the branching section;

a conversion-information storage section which holds conversion information showing a relationship between a predetermined pulse-count value and a corresponding analog detection value in a situation in which the pulse-count value by the pulse-counting section is unsaturated, under the detector voltage given from the voltage-generating section to the ion detector when a measurement is performed; and a converted-count-value calculation section configured to calculate a converted count value as an alternative detection value to the pulse-count value by the pulse-counting section when the pulse-count value by the pulse-counting section or the analog detection value by the analog detection section obtained by a measurement exceeds a predetermined value, using the analog detection value obtained by the measurement and the conversion information held in the conversion-information storage section.

2. The mass spectrometer according to claim 1, wherein:
the conversion-information storage section holds a plurality of pieces of conversion information each of which corresponds to each of a plurality of detector-voltage values different from each other; and
the converted-count-value calculation section is configured to selectively obtain, from the conversion-information storage section, the conversion information corresponding to one detector-voltage value among the plurality of detector-voltage values given from the voltage-generating section to the ion detector when the measurement is performed, and to calculate the converted count value using the obtained conversion information.

3. The mass spectrometer according to claim 2, further comprising a mode-selecting section configured to display a plurality of modes in a selectable form, including a sensitivity-oriented mode and a dynamic-range-oriented mode, and to receive a selection of one of the modes by a user, wherein:
the voltage-generating section has a function of changing the detector voltage given to the ion detector according to the mode selected by the mode-selecting section, where the detector voltage given when the dynamic-range-oriented mode is selected is lower than the detector voltage given when the sensitivity-oriented mode is selected; and
the converted-count-value calculation section is configured to obtain, from the conversion-information storage section, the conversion information corresponding to the detector voltage according to the mode selected by the mode-selecting section, and to calculate the converted count value.

4. The mass spectrometer according to claim 1, further comprising a saturation-reference-value storage section which stores a saturation reference value related to an analog detection value at which a saturation occurs in an output of the ion detector, where
the voltage-generating section is configured to set the detector voltage given to the ion detector, based on the pulse-count value, in such a manner that the analog detection value outputted from the analog detection section will not exceed the saturation reference value.

5. The mass spectrometer according to claim 1, further comprising a conversion-information acquisition section configured to calculate conversion information using a pulse-count value by the pulse-counting section and an analog detection value corresponding to the pulse-count value, and to save the conversion information in the conversion-information storage section, when both the pulse-count value and the analog detection value are obtained under a condition that the pulse-count value is unsaturated.

6. The mass spectrometer according to claim 5, wherein:
the conversion-information acquisition is configured to calculate the conversion information and to save the conversion information in the conversion-information storage section while a measurement is being performed; and
after the conversion information is saved in the conversion-information storage section while the measurement is being performed, when the pulse-count value by the pulse-counting section or the analog detection value by the analog detection section obtained by the measurement exceeds a predetermined value, the converted-count-value calculation section is configured to output, as an alternative detection value to the pulse-count value by the pulse-counting section, the converted count value calculated by using the analog detection value obtained by the measurement and the conversion information held in the conversion-information storage section.

7. The mass spectrometer according to claim 5, wherein:
after a measurement is performed, the conversion-information acquisition section is configured to calculate the conversion information using the pulse-count value and the analog detection value obtained in the measurement, and to save the conversion information in the conversion-information storage section; and
after the conversion information is saved in the conversion information storage section, when the pulse-count value by the pulse-counting section or the analog detection value by the analog detection section obtained by the measurement exceeds a predetermined value, the converted-count-value calculation section is configured to calculate the converted count value using the analog detection value obtained by the measurement and the conversion information held in the conversion-information storage section.

* * * * *